United States Patent [19]

Burden

[11] 4,396,724

[45] Aug. 2, 1983

[54] CERAMIC COMPOSITION

[75] Inventor: Stephen J. Burden, Troy, Mich.

[73] Assignee: General Electric Co., Waterford, N.Y.

[21] Appl. No.: 267,043

[22] Filed: May 26, 1981

[51] Int. Cl.³ ...................... C04B 35/48; C04B 35/52
[52] U.S. Cl. ...................................... 501/87; 501/98; 501/105
[58] Field of Search ............................. 501/87, 98, 105

[56] References Cited

U.S. PATENT DOCUMENTS

| | | | |
|---|---|---|---|
| 3,652,304 | 3/1972 | Daniels | 501/96 |
| 4,204,873 | 5/1980 | Yamamoto et al. | 501/87 |
| 4,211,624 | 7/1980 | Semkina et al. | 501/105 |
| 4,218,253 | 8/1980 | Dworak et al. | 501/105 |

FOREIGN PATENT DOCUMENTS

| | | | |
|---|---|---|---|
| 2549652 | 12/1975 | Fed. Rep. of Germany | 501/105 |
| 2744700 | 4/1979 | Fed. Rep. of Germany | 501/105 |
| 1527780 | 10/1978 | United Kingdom | 501/105 |

*Primary Examiner*—James Poer
*Attorney, Agent, or Firm*—Hedman, Casella, Gibson, Costigan & Hoare

[57] ABSTRACT

Improved ceramic compositions useful for cutting tools and the like are described. They are composed of an essentially homogeneous admixture of sintered powders of an aluminum oxide base material with other refractories including zirconium oxide, titanium oxide, hafnium oxide, titanium nitride, zirconium nitride, and tungsten or molybdenum carbide. In addition to their common and improved properties of hardness and strength, many of these compositions may be made by simple cold-pressing and sintering procedures. This avoids the known drawbacks of conventional hot press production.

9 Claims, No Drawings

CERAMIC COMPOSITION

BACKGROUND OF THE INVENTION

Sintered ceramic compositions composed primarily of non-metallic refractory materials have proven advantageous where high temperature resistance, breakage strength, good wear and allied properties are required. Typical instances of use include construction materials and machining tools.

Many such compositions are predicated upon a predominant base material which is aluminum oxide ($Al_2O_3$). Aluminum oxide is both abundant and imbued with many of the properties desired for these uses. Unfortunately, it also possesses various deficiencies, such as brittleness. As a result, it has frequently been alloyed with other components in an effort to improve over-all ceramic properties.

Among the other sinterable and machanically resistant materials known to be suitable for this same purpose are many metal carbides, nitrides, borides and other oxides. Some of these materials have been used with aluminum oxide to produce composite compositions having hybrid properties.

A standard of the cutting tool industry, for example, involves aluminum oxide-titanium carbide compositions. These ceramics offer many more desirable physical properties. Unfortunately, they can generally be produced only by hot-pressing procedures. This drawback has contributed substantially to the search for other, less difficult to produce, compositions.

Aluminum oxide-based compositions containing zirconium oxide are also known. In German Offenlegungsschrift No. 2,549,652, it is indicated that aluminum and zirconium oxide compositions, in which the zirconium oxide was transformed from tetragonal to the less dense monoclinic form to create microfissures in the ultimate ceramic article, are desirable. The microfissures are said to increase fracture resistance by allowing absorption of physical stress.

In U.S. Pat. No. 4,218,253, another such composition is described. There, particles of tetragonal zirconium oxide are incorporated within a base material containing aluminum oxide. Instead of possessing microfissures to enhance fracture resistance, however, the resultant ceramic composition is said to improve binding strength by an ability to undergo stress-induced plastic deformation involving conversion of the zirconium oxide to monoclinic form or phase.

Ceramic compositions containing aluminum oxide, titanium nitride and tungsten carbide are also known. In U.S. Pat. No. 4,204,873 such a composition is disclosed, but said composition can be produced only by hot-pressing. U.S. Pat. No. 3,652,304 discloses other nitride-oxide refractories which are produced by hot-pressing.

Notwithstanding the properties of the foregoing compositions, further improvement remains desirable. In many instances, the improvement in the properties has been accompanied by impairment of others. Enhancement of properties without such a drawback therefore remains a highly desirable object.

Improvement in production techniques has also been desired. Most such compositions can be manufactured only by such complicated techniques as hot-pressing. This drawback greatly increases their price.

INTRODUCTION TO THE INVENTION

It has been discovered that ceramic compositions comprising an essentially homogeneous admixture of an aluminum oxide base material with certain other refractories including zirconium oxide, titanium oxide, hafnium oxide, titanium nitride, zirconium nitride, and tungsten or molybdenum carbide provide substantial improvements in product properties and/or facilitate their production.

More particularly, it has been discovered that the synergistic addition of tungsten carbide and zirconium oxide—both with or without titanium nitride—to aluminum oxide provides heightened hardness and strength. These properties result in a substantial increase in wear resistance for the ultimate ceramic articles.

Further, many of these novel articles are capable of similified production. Instead of hot-pressing the initial powdered component admixture, pressureless sintering is possible. Thus, conventional cold-press and subsequent sintering procedures, which reduce cost and necessary equipment, may be employed.

DESCRIPTION OF THE INVENTION

The ceramic compositions of the present invention are generally composed predominantly of aluminum oxide. They desirably contain as much as 50 to 90% aluminum oxide by total weight.

To facilitate production of the ultimate, essentially homogeneous admixture of components in the sintered compositions of this invention, the aluminum oxide-base material is usually provided in an initial, finely powdered form. Particles having a mean size of from about 0.01 to 1.0$\mu$ are particularly desirable for this purpose. Commercial purity, 99.5%, aluminum oxide which contains 0.05% to 0.1% magnesium oxide as a grain growth inhibitor is also sufficient for this purpose.

The present compositions must also contain a tungsten or molybdenum carbide modifier. For admixture with the aluminum oxide (prior to sintering), the modifier(s) employed should also be finely powdered. Thus, a mean particle size of from 0.01 to 1.0$\mu$ is preferred. The carbide modifier can be present in amounts up to 5% of the total composition weight.

The present compositions must also contain tetragonal zirconium or hafnium oxide. Again, a mean particle size of 0.01 to 1.0$\mu$ is preferred. The form or phase of the zirconium oxide and/or hafnium oxide present in the compositions is quite important. Monoclinic zirconium oxide and hafnium oxide (as opposed to tetragonal) are the stable forms of these oxides at ambient temperatures. The monoclinic structure also possesses the greater volume of the two crystalline forms.

In provision of the initial zirconium oxide or hafnium oxide powder and during subsequent treatment (especially including sintering) care should be taken that the oxide be in the desired crystalline form. The ultimate product composition is preferably essentially free of fissures, including the microfissures described in the previously discussed German Offenlegungsschrift No. 2,549,652. Therefore, the monoclinic form or phase transformation described in that publication should be avoided.

Some monoclinic zirconium or hafnium oxide may, of course, be tolerated in the present composition. Transformation of monoclinic crystals on cooling should, however, be controlled through conventional techniques to ensure the foregoing objective. There are no such provisions for the titanium oxide powder as both monoclinic and tetragonal forms are stable at room temperature.

Although the titanium oxide, hafnium oxide, and/or zirconium oxide may be present in widely varient proportions, normally they should not together amount to more than 30%, most usually 10–20%, by total composition weight. The remainder constitutes: aluminum oxide up to 90%, most usually 50 to 75%; and zirconium or titanium nitride up to 30%, most usually 1 to 15%, and tungsten or molybdenum carbide up to 5%, most usually 2 to 3%, by total composition weight. These nitride and carbide additions further increase wear resistance and do so without adverse effect on sinterability or resultant rupture strength.

In one preferred embodiment of the invention, from 1 to 15% titanium nitride and from 10 to 15% zirconium oxide with 2 to 3% tungsten carbide are employed, with a remainder of from about 67 to 87% aluminum oxide by total weight. The initial powdered admixture of these components may be subjected to cold-pressing and then sintering procedures to produce the ceramic compositions.

In another preferred embodiment, from 25 to 30% by total weight of titanium nitride and 10 to 15% zirconium oxide, with a remainder of from about 52 to 63% aluminum oxide by total weight, are employed. Further, up to 5%, but preferably from 2 to 3%, tungsten carbide is added. The high proportion of titanium nitride, however, may make difficult the use of cold-pressing and sintering procedures. Consequently, substituting titanium oxide for part of the titanium nitride has the advantage of facilitating the pressureless sintering without adversely affecting the strength and hardness of the final product. The titanium oxide can be substituted in amounts up to 50% of the amount of titanium nitride by weight.

As set forth above, all these compositions can be produced by hot-pressing of an admixture of their initial, powdered components. This conventional procedure normally involves subjecting the powdered admixture to the combined conditions of a pressure of from 100 to 600 kg/cm$^2$ and temperature of from 1500° C. to 2000° C. for at least about 2 minutes. Because of the limitation of this procedure, however, cold-pressing and sintering is preferred. For this procedure, the powdered admixture is first compressed under a pressure of from 1000 to 3000 kg/cm$^2$ at ambient or mild temperature. Thereafter, the compact may be sintered (without pressure) at a temperature of at least 1400° C., preferably at from 1550° C. to 1800° C., for from 30 minutes to 4 hours. During the sintering operation, the tungsten or molybdenum carbide reacts with the oxide components of the composition, increasing the sinterability of said composition and transforming the tungsten/molybdenum carbide to tungsten/molybdenum metal.

The following examples illustrate the present invention:

EXAMPLE 1

Eight-six parts by weight of aluminum oxide were mixed with 12 parts of zirconium oxide and 2 parts of tungsten carbide. The mixture was wet-milled for a period of 12 hours, paraffin wax was added as a pressing aid, and pieces were pressed at room temperature using 1400 kg/cm$^2$ pressure. The pieces were presintered at 500° C. for 30 minutes and sintered at 1600° C. for 1 hour in vacuum. The sintered pieces had a density greater than 99% of the theoretical and X-ray diffraction analysis indicated the presence of Al$_2$O$_3$, ZrO$_2$, and W. The ZrO$_2$ was present predominantly in the tetragonal form, with less than 10% of the ZrO$_2$ present in the monoclinic form.

Test bars were ground using diamond wheels, and the modulus of rupture was determined in three-point bending. The average rupture strength was about 100,000 to 115,000 psi, and the hardness was measured to be 93.5 on the Rockwell "A" scale.

EXAMPLE 2

Seventy-four parts by weight of aluminum oxide were mixed with 12 parts zirconium oxide, 12 parts titanium nitride and 2 parts tungsten carbide, and test bars were prepared according to the method of Example 1. The sintered pieces had a density greater than 99% of theoretical, and X-ray diffraction analysis indicated the presence of Al$_2$O$_3$, ZrO$_2$, TiN, and W. The ZrO$_2$ was present predominantly in the tetragonal form. The average modulus of rupture was determined to be 100,000 to 115,000 psi, and the hardness was measured to be 94.0 on the Rockwell "A" scale.

EXAMPLE 3

Fifty-seven parts by weight of aluminum oxide were mixed with 12 parts zirconium oxide, 25 parts of titanium nitride, 4 parts of titanium oxide, and 2 parts of tungsten carbide. Test bars were prepared according to Example 1 except that the sintering temperature was raised to 1650° C. The sintered pieces had a density greater than 99% of theoretical, and X-ray diffrection analysis indicated the presence of Al$_2$O$_3$, ZrO$_2$, TiN and W. The ZrO$_2$ was present predominantly in the tetragonal form. The average modulus of rupture was determined to be 100,000 to 110,000 psi, and the hardness was measured to be 93.5 on the Rockwell "A" scale.

EXAMPLE 4

Fifty-seven parts by weight of aluminum oxide were mixed with 12 parts zirconium oxide, 29 parts of titanium nitride and 2 parts of tungsten carbide. The mixture was wet-milled for a period of 12 hours and dried. The powder was charged into a graphite die and hot-pressed at a pressure of 200 kg/cm$^2$ at a temperature of 1700° C. for 30 minutes. Test bars were sliced out of the hot-pressed piece using diamond wheels and ground using diamond wheels. The average modulus of rupture was determined to be 125,000 psi, and the hardness was measured to be 94.0 on the Rockwell "A" scale.

It should be understood that the foregoing examples relate only to presently preferred embodiments and that it is intended to cover all changes and modifications of the examples of the invention chosen herein for the purpose of the disclosure which do not depart from the spirit and scope of the invention as set forth in the appended claims. As an example, in the compositions set forth in the Examples, hafnium oxide may be substituted for zirconium oxide. In addition, molybdenum carbide may be substituted for tungsten carbide.

The disclosures of the patents and publications mentioned above are incorporated herein by reference to more fully describe the subject matter to which the present invention related. Also, it is to be understood that changes may be made in the particular described embodiments hereof without departing from the scope of this invention.

I claim:

1. In a ceramic composition comprising an essentially homogeneous admixture of sintered powders of an aluminum oxide base refractory material, the improvement wherein said composition additionally contains zirconium oxide and tungsten carbide in an amount sufficient to enhance wear resistance while permitting said powder to undergo pressureless sintering.

2. The composition of claim 1 wherein the composition also includes titanium nitride.

3. The composition of claim 2, wherein the zirconium oxide is present in an amount from 1 to 30% and titanium nitride is present in an amount from 1 to 30% by total weight.

4. The composition of claim 3, further including titanium oxide in an amount from 1 to 15% by total weight.

5. The composition of claim 1, wherein the tungsten carbide is present in amounts up to 5% by total weight.

6. The composition of claim 1, wherein the powders are cold-pressed and then sintered.

7. The composition of claim 1 wherein the composition also includes zirconium nitride.

8. The composition of claim 2, wherein the titanium nitride is present in from 15 to 30% by total weight.

9. In a ceramic composition comprising an essentially homogeneous admixture of sintered powders of an aluminum oxide base refractory material, the improvement wherein said composition additionally contains zirconium oxide, tungsten carbide, and titanium nitride, the aluminum oxide comprising from 67–87%, the zirconium oxide comprising 10–15%, the titanium nitride comprising 1–15% and the tungsten carbide comprising 2–3% by total weight.

* * * * *